(12) United States Patent
Dundas et al.

(10) Patent No.: US 8,694,759 B2
(45) Date of Patent: Apr. 8, 2014

(54) GENERATING PREDICTED BRANCH TARGET ADDRESS FROM TWO ENTRIES STORING PORTIONS OF TARGET ADDRESS BASED ON STATIC/DYNAMIC INDICATOR OF BRANCH INSTRUCTION TYPE

(75) Inventors: James D. Dundas, Austin, TX (US); Marvin A. Denman, Round Rock, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 671 days.

(21) Appl. No.: 12/945,732

(22) Filed: Nov. 12, 2010

(65) Prior Publication Data
US 2012/0124347 A1 May 17, 2012

(51) Int. Cl.
*G06F 9/38* (2006.01)
(52) U.S. Cl.
USPC ....... 712/237; 712/238; 712/239; 712/E9.051
(58) Field of Classification Search
None
See application file for complete search history.

(56) References Cited

U.S. PATENT DOCUMENTS

| | | | |
|---|---|---|---|
| 8,019,980 B2 * | 9/2011 | Wang | 712/238 |
| 2004/0230780 A1 * | 11/2004 | Prasky et al. | 712/238 |
| 2011/0093658 A1 * | 4/2011 | Zuraski et al. | 711/125 |

* cited by examiner

*Primary Examiner* — Kenneth Kim
(74) *Attorney, Agent, or Firm* — Williams Morgan, P.C.

(57) ABSTRACT

A method and apparatus to utilize a branch prediction scheme that limits the expenditure of power and the area consumed caused by branch prediction schemes is provided. The method includes accessing a first entry and a second entry of the data structure, wherein each entry stores a portion of a predicted target address, determining the predicted target address using the portion of the predicted target address stored in the first entry and a portion of a branch address of a fetched branch instruction for a fetched branch instruction of a first type, and determining the predicted target address using the portion of the predicted target address stored in the first entry and the portion of the predicted target address stored in the second entry for a fetched branch instruction of a second type.

27 Claims, 6 Drawing Sheets

GENERATING PREDICTED BRANCH TARGET ADDRESS FROM TWO ENTRIES STORING PORTIONS OF TARGET ADDRESS BASED ON STATIC/DYNAMIC INDICATOR OF BRANCH INSTRUCTION TYPE

BACKGROUND OF THE INVENTION

1. Field of the Invention

Embodiments of this invention relate generally to computers, and, more particularly, to a method and apparatus for efficiently performing branch prediction operations to conserve power and area.

2. Description of Related Art

Program instructions for some processors (e.g., central processing units, graphics processing units, etc.; also referred to as microprocessors) are typically stored in sequential, addressable locations within a memory. When these instructions are processed, the instructions may be fetched from consecutive memory locations and stored in a cache commonly referred to as an instruction cache. The instructions may later be retrieved from the instruction cache and executed. Each time an instruction is fetched from memory, a next instruction pointer within the microprocessor may be updated so that it contains the address of the next instruction in the sequence. The next instruction in the sequence may commonly be referred to as the next sequential instruction pointer. Sequential instruction fetching, updating of the next instruction pointer and execution of sequential instructions, may continue linearly until an instruction, commonly referred to as a branch instruction, is encountered and taken.

A branch instruction is an instruction that causes subsequent instructions to be fetched from one of at least two addresses: a sequential address identifying an instruction stream beginning with instructions, which directly follow the branch instruction; or an address referred to as a "target address," which identifies an instruction stream beginning at an arbitrary location in memory. A branch instruction, referred to as an "unconditional branch instruction," always branches to the target address, while a branch instruction, referred to as a "conditional branch instruction," may select either the sequential or the target address based on the outcome of a prior instruction.

To efficiently execute instructions, microprocessors may implement a mechanism, commonly referred to as a branch prediction mechanism. A branch prediction mechanism determines a predicted direction ("taken" or "not taken") for an encountered branch instruction, allowing subsequent instruction fetching to continue along the predicted instruction stream indicated by the branch prediction. For example, if the branch prediction mechanism predicts that the branch instruction will be "taken," then the next instruction fetched is located at the target address. If the branch mechanism predicts that the branch instruction will not be taken, then the next instruction fetched is sequential to the branch instruction.

If the predicted instruction stream is correct, then the number of instructions executed per clock cycle is advantageously increased. However, if the predicted instruction stream is incorrect (i.e., one or more branch instructions are predicted incorrectly), then the instructions from the incorrectly predicted instruction stream are discarded from the instruction processing pipeline and the other instruction stream is fetched. Therefore, the number of instructions executed per clock cycle is decreased.

There is an incentive to construct accurate, and presumably complex, branch prediction schemes. There is also an incentive to perform as much speculative execution as possible in order to avoid pipeline stalls and improve computer performance. However, as branch prediction schemes and speculative execution become more accurate and complex, the power and area consumed by implementing such schemes increases. While the performance enhancement offered by branch prediction and speculative execution is desirable in nearly any computer, the additional power and area consumption it entails is a drawback. For example, when running a portable computer on battery power, it may be more important to conserve power and area than to try to increase computational throughput.

SUMMARY OF EMBODIMENTS OF THE INVENTION

In one aspect of the present invention, a method is provided. The method includes allocating a first entry in a data structure, which stores a first portion of a predicted target address of a branch instruction. The method also includes allocating a second entry in the data structure, which stores a second portion of the predicted target address of a branch instruction in response to determining that the target address is outside a predetermined address range.

In another aspect of the present invention, another method is provided. The method includes accessing a first entry and a second entry of a data structure, wherein each entry stores a portion of a predicted target address. The method also includes determining the predicted target address using the portion of the predicted target address stored in the first entry and a portion of a branch address of a fetched branch instruction for a fetched branch instruction of a first type. The method further includes determining the predicted target address using the portion of the predicted target address stored in the first entry and the portion of the predicted target address stored in the second entry for a fetched branch instruction of a second type.

In yet another aspect of the present invention, an apparatus is provided. The apparatus includes a processor. The processor is configured to access a first entry and a second entry of a data structure, wherein each entry stores a portion of a predicted target address. The processor is also configured to determine the predicted target address using the portion of the predicted target address stored in the first entry and a portion of a branch address of a fetched branch instruction for a fetched branch instruction of a first type. The processor is also configured to determine the predicted target address using the portion of the predicted target address stored in the first entry and the portion of the predicted target address stored in the second entry for a fetched branch instruction of a second type.

In yet another aspect of the present invention, a computer readable storage medium encoded with data that, when implemented in a manufacturing facility, adapts the manufacturing facility to create an apparatus. The apparatus includes a processor. The processor is configured to access a first entry and a second entry of the data structure, wherein each entry stores a portion of a predicted target address. The processor is also configured to determine the predicted target address using the portion of the predicted target address stored in the first entry and a portion of a branch address of a fetched branch instruction for a fetched branch instruction of a first type. The processor is also configured to determine the predicted target address using the portion of the predicted target address stored in the first entry and the portion of the predicted target address stored in the second entry for a fetched branch instruction of a second type.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
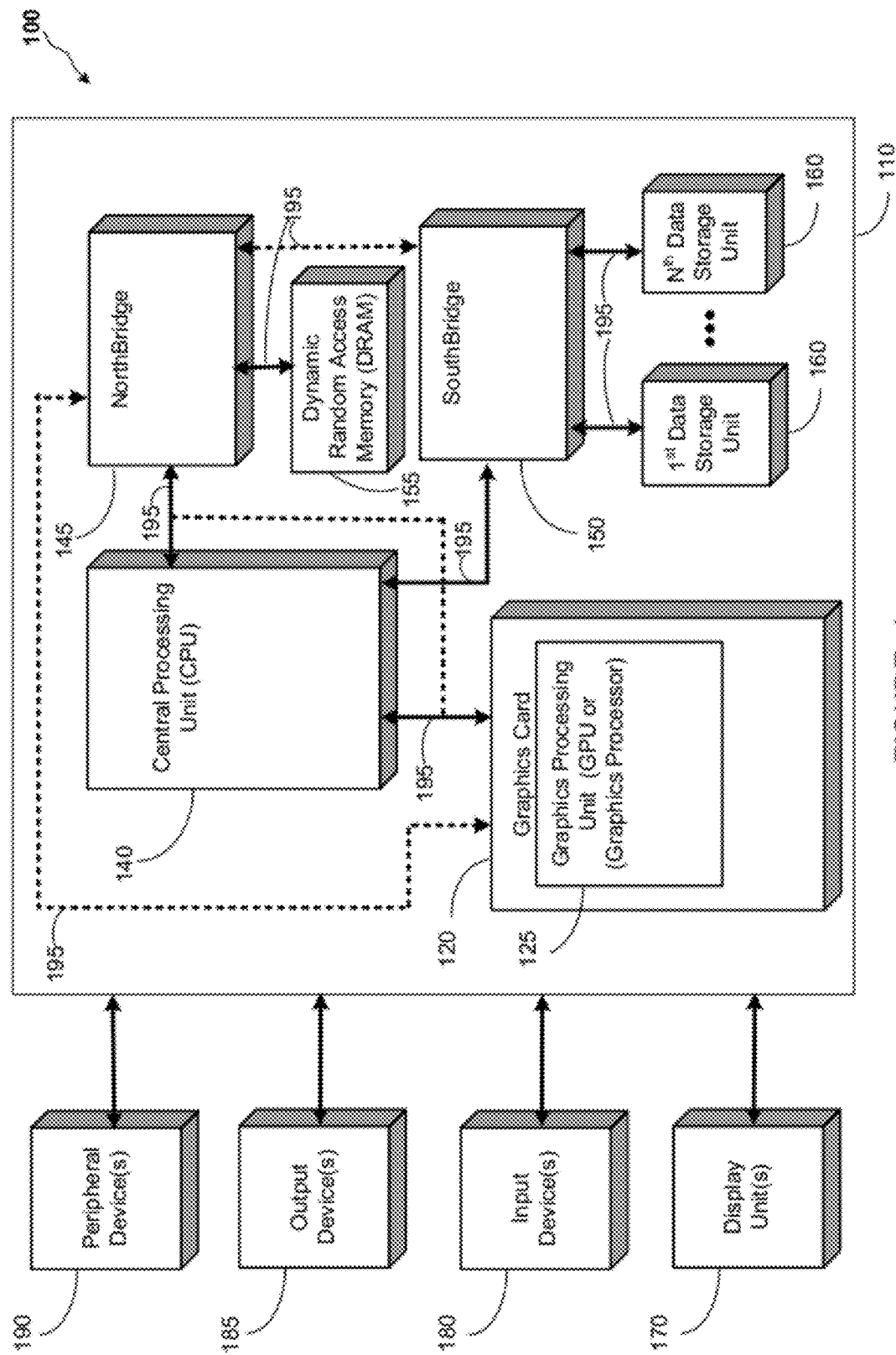
FIG. 1 schematically illustrates a simplified block diagram of a computer system according to one embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Embodiments of the present invention will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments of the present invention generally provide a branch prediction scheme for instructions in a processor to limit the expenditure of power and the area typically consumed by employing branch prediction schemes Turning now to FIG. 1, a block diagram of an exemplary computer system 100, in accordance with an embodiment of the present invention, is illustrated. In various embodiments the computer system 100 may be a personal computer, a laptop computer, a handheld computer, a netbook computer, a mobile device, a telephone, a personal data assistant (PDA), a server, a mainframe, a work terminal, or the like. The computer system includes a main structure 110, which may be a computer motherboard, system-on-a-chip, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be an ATI Radeon™ graphics card from Advanced Micro Devices ("AMD") or any other graphics card using memory, in alternate embodiments. The graphics card 120 may, in different embodiments, be connected on a Peripheral Component Interconnect (PCI) Bus (not shown), PCI-Express Bus (not shown) an Accelerated Graphics Port (AGP) Bus (also not shown), or any other connection known in the art. It should be noted that embodiments of the present invention are not limited by the connectivity of the graphics card 120 to the main computer structure 110. In one embodiment, the computer system 100 runs an operating system such as Linux, Unix, Windows, Mac OS, or the like.

In one embodiment, the graphics card 120 may contain a further processor, graphics processing unit (GPU) 125, used in processing graphics data. In various embodiments the graphics card 120 may be referred to as a circuit board or a printed circuit board or a daughter card or the like. Alternatively, GPU 125 may be included on the motherboard 110 or in another component such as northbridge 145 or processor (e.g., CPU) 140.

In one embodiment, the computer system 100 includes a central processing unit (CPU) 140, which is connected to a northbridge 145. The CPU 140 and the northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, the CPU 140, the northbridge 145, and the GPU 125 may be included in a single package or as part of a single die or "chips". Alternative embodiments, which may alter the arrangement of various components illustrated as forming part of main structure 110, are also contemplated. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and the southbridge 150 may be on the same chip in the computer system 100, or the northbridge 145 and the southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, the northbridge 145, the southbridge 150, the graphics processing unit 125, and/or the DRAM 155 may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185, and/or peripheral devices 190. It is contemplated that in various embodiments, these elements may be internal or external to the computer system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like. To the extent certain exemplary aspects of the computer system 100 are not described herein, such exemplary aspects may or may not be included in various embodiments without limiting the spirit and scope of the embodiments of the present invention as would be understood by one of skill in the art.

Figure 2:
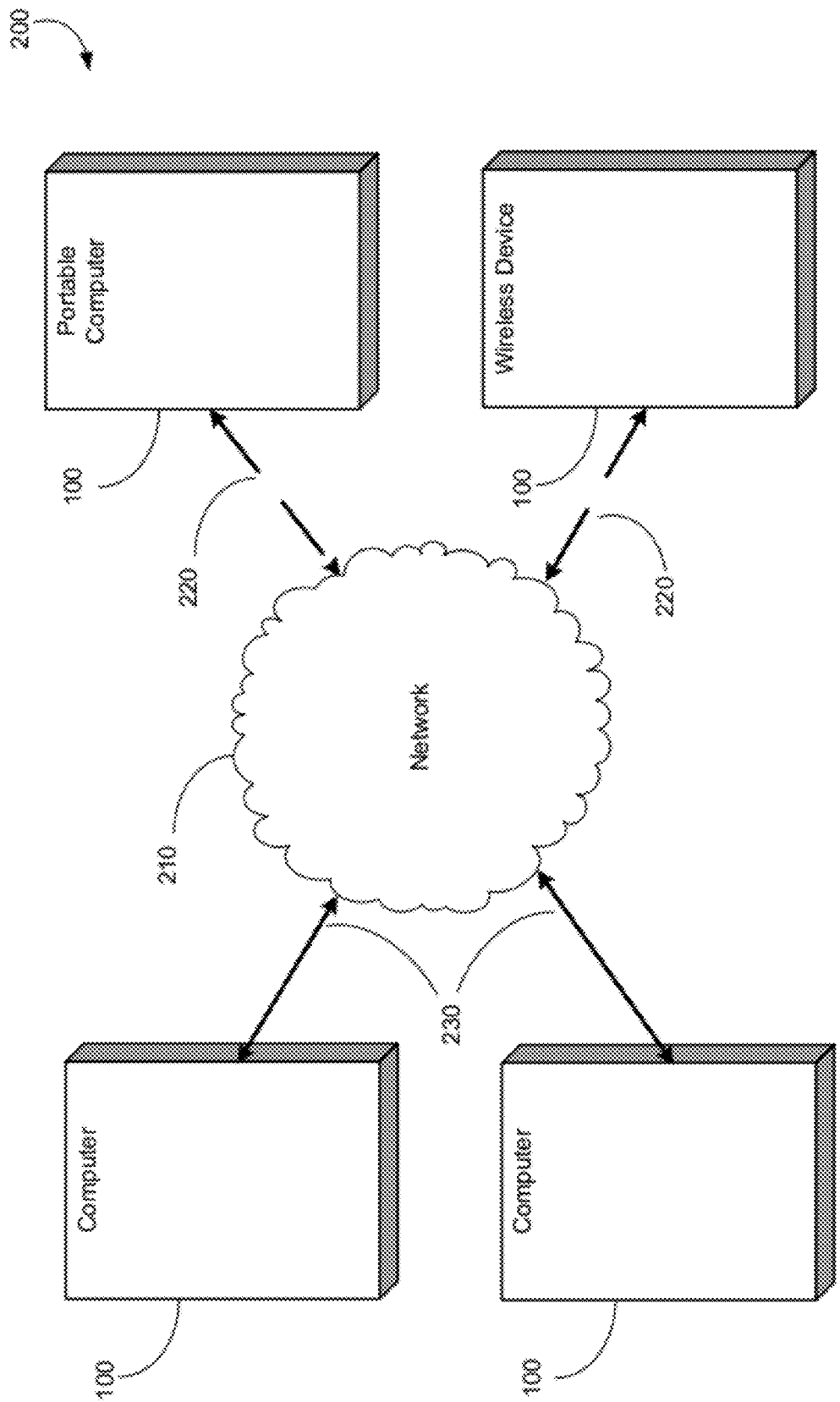
FIG. 2 shows a simplified block diagram of multiple computer systems connected via a network according to one embodiment.

Turning now to FIG. 2, a block diagram of an exemplary computer network 200, in accordance with an embodiment of the present invention, is illustrated. In one embodiment, any number of computer systems 100 may be communicatively coupled and/or connected to each other through a network infrastructure 210. In various embodiments, such connections may be wired 230 or wireless 220 without limiting the scope of the embodiments described herein. The network 200 may be a local area network (LAN), wide area network (WAN), personal network, company intranet or company network, the Internet, or the like. In one embodiment, the computer systems 100 connected to the network 200 via network infrastructure 210 may be a personal computer, a laptop computer, a netbook computer, a handheld computer, a mobile device, a telephone, a personal data assistant (PDA), a server, a mainframe, a work terminal, or the like. The number of computers depicted in FIG. 2 is exemplary in nature; in practice, any number of computer systems 100 may be coupled/connected using the network 200

Figure 3:
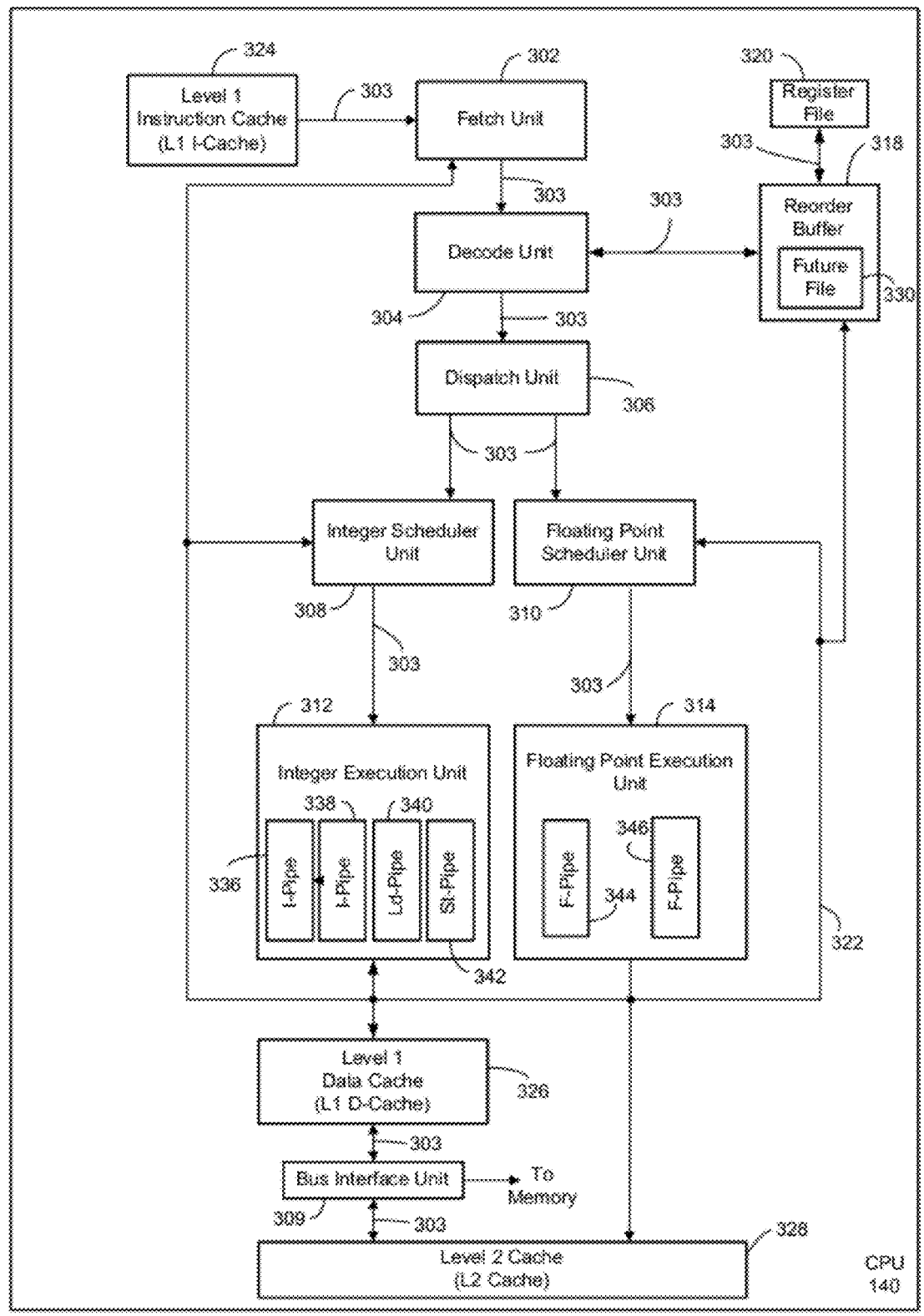
FIG. 3 illustrates an exemplary detailed representation of one embodiment of the central processing unit provided in FIGS. 1-2 according to one embodiment.

Turning now to FIG. 3, a diagram of an exemplary implementation of the CPU 140, in accordance with an embodiment of the present invention, is illustrated. The CPU 140 includes a fetch unit 302, a decode unit 304, a dispatch unit 306, an integer scheduler unit 308 a floating-point scheduler unit 310, an integer execution unit 312, a floating-point execution unit 314, a reorder buffer 318, and a register file 320. In one or more embodiments, the various components of the CPU 140 may be operatively, electrically and/or physically connected or linked with a bus 303 or more than one bus 303. The CPU 140 may also include a result bus 322, which couples the integer execution unit 312 and the floating-point execution unit 314 with the reorder buffer 318, the integer scheduler unit 308, the floating-point execution unit 310 and the fetch unit 302. Results that are delivered to the result bus 322 by the execution units 312, 314 may be used as operand values for subsequently issued instructions and/or values stored in the reorder buffer 318. The CPU 140 may also include a Level 1 Instruction Cache (L1 I-Cache) 324 for storing instructions, a Level 1 Data Cache (L1 D-Cache 326) for storing data and a Level 2 Cache (L2 Cache) 328 for storing data and instructions. As shown, in one embodiment, the L1 D-Cache 326 may be coupled to the integer execution unit 312 via the result bus 322, thereby enabling the integer execution unit 312 to request data from the L1 D-Cache 326. In some cases, the integer execution unit 312 may request data not contained in the L1 D-Cache 326. Where requested data is not located in the L1 D-Cache 326, the requested data may be retrieved from a higher-level cache (such as the L2 cache 328) or the system memory 155 (shown in FIG. 1) via a bus interface unit 309. In another embodiment, the L1 D-cache 326 may also be coupled to the floating-point execution unit 314. In this case, the integer execution unit 312 and the floating-point execution unit 314 may share a unified L1 D-Cache 326. In another embodiment, the floating-point execution unit 314 may be coupled to its own respective L1 D-Cache. As shown, in one embodiment, the integer execution unit 312 and the floating-point execution unit 314 may be coupled to and share an L2 cache 328. In another embodiment, the integer execution unit 312 and the floating-point execution unit 324 may be each coupled to its own respective L2 cache. In one embodiment, the L2 cache 328 may provide data to the L1 I-Cache 324 and L1 D-Cache 326. In another embodiment, the L2 cache 328 may also provide instruction data to the L1 I-Cache 324. In different embodiments, the L1 I-Cache 324, L1 D-Cache 326, and the L2 Cache 328 may be may be implemented in a fully-associated, set-associative, or direct mapped configuration. In one embodiment, the L2 Cache 328 may be larger than the L1 I-Cache 324 or the L1 D-Cache 326. In alternate embodiments, the L1 I-Cache 324, the L1 D-Cache 326 and/or the L2 cache 328 may be separate from or external to the CPU 140 (e.g. located on the motherboard). It should be noted that embodiments of the present invention are not limited by the sizes and configuration of the L1 I-Cache 324, the L1 D-Cache 326, and the L2 cache 328.

Referring still to FIG. 3, the CPU 140 may support out-of-order instruction execution. Accordingly, the reorder buffer 318 may be used to maintain the original program sequence for register read and write operations, to implement register renaming, and to allow for speculative instruction execution and branch misprediction recovery. The reorder buffer 318 may be implemented in a first-in-first-out (FIFO) configuration in which operations move to the bottom of the reorder buffer 318 as they are validated, making room for new entries at the top of the reorder buffer 318. The reorder buffer 318 may retire an operation once an operation completes execution and any data or control speculation performed on any operations, up to and including that operation in program order, is verified. In the event that any data or control speculation performed on an operation is found to be incorrect (e.g., a branch prediction is found to be incorrect), the results of speculatively-executed instructions along the mispredicted path may be invalidated within the reorder buffer 318. It is noted that a particular instruction is speculatively executed if it is executed prior to instructions that precede the particular instruction in program order.

In one embodiment, the reorder buffer 318 may also include a future file 330. The future file 330 may include a plurality of storage locations. Each storage location may be assigned to an architectural register of the CPU 140. For example, in the x86 architecture, there are eight 32-bit architectural registers (e.g., Extended Accumulator Register (EAX), Extended Base Register (EBX), Extended Count Register (ECX), Extended Data Register (EDX), Extended Base Pointer Register (EBP), Extended Source Index Register (ESI), Extended Destination Index Register (EDI) and Extended Stack Pointer Register (ESP)). Each storage location may be used to store speculative register states (i.e., the most recent value produced for a given architectural register by any instruction). Non-speculative register states may be stored in the register file 320. When register results stored within the future file 330 are no longer speculative, the results may be copied from the future file 330 to the register file 320. The storing of non-speculative instruction results into the register file 320 and freeing the corresponding storage locations within reorder buffer 318 is referred to as retiring the instructions. In the event of a branch mis-prediction or discovery of an incorrect speculatively-executed instruction, the contents of the register file 320 may be copied to the future file 330 to replace any erroneous values created by the execution of these instructions.

Referring still to FIG. 3, the fetch unit 302 may be coupled to the L1 I-Cache 324 (or a higher memory subsystem, such as the L2 cache 328 or the system memory 155 (shown in FIG. 1)). The fetch unit 302 may fetch instructions from the L1 I-Cache 324 for the CPU 140 to process. The fetch unit 302 may contain a program counter, which holds the address in the L1 I-Cache 324 (or higher memory subsystem) of the next instruction to be executed by the CPU 140. In one embodiment, the instructions fetched from the L1 I-Cache 324 may be complex instruction set computing (CISC) instructions selected from a complex instruction set, such as the x86 instruction set implemented by processors conforming to the x86 processor architecture. Once the instruction has been fetched, the instruction may be forwarded to the decode unit 304. In one embodiment, the fetch unit 302 may also use prefetching techniques to increase the speed of program execution. For example, in one embodiment, the fetch unit 302 may request an instruction (or instructions) from the L2 cache 328 or the system memory 155 before it is actually ready for execution. Once the instruction comes back from the L2 cache 328 or the system memory 155, it may be placed in the L1 I-Cache 324. Thus, when the instruction is actually ready for execution, the instruction can be accessed much more quickly from the L1 I-Cache 324 than if it had to make a request from the L2 cache 328 or the system memory 155.

The fetch unit 302 may also include a branch prediction mechanism. For example, the fetch unit 302 may predict the result (i.e., the path to be taken) of a conditional branch instruction and/or predict the target address of an indirect branch instruction and subsequently fetch the corresponding instructions in advance. A conditional branch instruction can either be "not taken" or "taken." When the conditional branch instruction is "not taken," execution continues along the "not taken" path, where the instructions follow immediately after the conditional branch instruction. When the conditional branch instruction is "taken," execution may continue along the "taken" path, where instructions are stored in a different location in program memory. The path to be most likely taken (i.e., the predicted path) is fetched and speculatively executed. If it is later detected that the predicted path was wrong (e.g., when the conditional branch instruction is evaluated by the appropriate execution unit 312, 314), then the speculatively executed or partially executed instructions are discarded, and the pipeline restarts by fetching instructions along the correct path.

In another embodiment, the branch prediction mechanism may also be configured to predict the target address of an indirect branch instruction. Thus, when the branch prediction mechanism encounters an indirect branch instruction and predicts it as "taken," it can also predict the target address that the predicted branch will probably use. When predicting indirect branch instructions, the target address is predicted because the target address cannot be calculated without fetching the operands of the branch instruction. Since the operands are in registers and/or memory locations, the value of the operands may change between various executions of a particular indirect branch instruction. As a result, the target address of the particular indirect branch instruction may change from execution to execution. As will be discussed in FIG. 4, to predict a target address for a particular indirect branch instruction, the branch prediction mechanism may use a history of recently predicted indirect branch instructions.

Referring still to FIG. 3, the decode unit 304 may decode the instruction and determine the opcode of the instruction, the source and destination operands for the instruction, and a displacement value (if the instruction is a load or store) specified by the encoding of the instruction. The source and destination operands may be values in registers or in memory locations. A source operand may also be a constant value specified by immediate data specified in the instruction encoding. Values for source operands located in registers may be requested by the decode unit 304 from the reorder buffer 318. The reorder buffer 318 may respond to the request by providing either the value of the register operand or an operand tag corresponding to the register operand for each source operand. The reorder buffer 318 may access the future file 330 to obtain values for register operands. If a register operand value is available within the future file 330, the future file 330 may return the register operand value to the reorder buffer 318. On the other hand, if the register operand value is not available within the future file 330, the future file 330 may return an operand tag corresponding to the register operand value. The reorder buffer 318 may then provide either the operand value (if the value is ready) or the corresponding operand tag (if the value is not ready) for each source register operand to the decode unit 304. The reorder buffer 318 may also provide the decode unit 304 with a result tag associated with the destination operand of the instruction if the destination operand is a value to be stored in a register. In this case, the reorder buffer 318 may also store the result tag within a storage location reserved for the destination register within the future file 330. As instructions are completed by the execution units 312, 314, each of the execution units 312, 314 may broadcast the result of the instruction and the result tag associated with the result on the result bus 303. When each of the execution units 312, 314 produces the result and drives the result and the associated result tag on the result bus 322, the reorder buffer 318 may determine if the result tag matches any tags stored within. If a match occurs, the reorder buffer 318 may store the result within the storage location allocated to the appropriate register within the future file 330.

After the decode unit 304 decodes the instruction, the decode unit 304 may forward the instruction to the dispatch unit 306. The dispatch unit 306 may determine if an instruction is forwarded to either the integer scheduler unit 308 or the floating-point scheduler unit 310. For example, if an opcode for an instruction indicates that the instruction is an integer-based operation, the dispatch unit 306 may forward the instruction to the integer scheduler unit 308. Conversely, if the opcode indicates that the instruction is a floating-point operation, the dispatch unit 306 may forward the instruction to the floating-point scheduler unit 310.

Once an instruction is ready for execution, the instruction is forwarded from the appropriate scheduler unit 308, 310 to the appropriate execution unit 312, 314. Instructions from the integer scheduler unit 308 are forwarded to the integer execution unit 312. In one embodiment, integer execution unit 312 includes two integer execution pipelines 336, 338, a load execution pipeline 340 and a store execution pipeline 342, although alternate embodiments may add to or subtract from the set of integer execution pipelines and the load and store execution pipelines. Arithmetic, logical, and branch instructions may be forwarded to either one of the two integer execution pipelines 336, 338, where the instructions are executed and the results of the instructions are broadcast to the reorder buffer 318, the scheduler units 308, 310, and/or the fetch unit 302 via the result bus 322. When executing a conditional branch instruction, the actual path to be taken by the conditional branch instruction may be determined. If it is determined that the actual path to be taken is different than the path predicted by the fetch unit 302, then the speculatively-executed or partially executed instructions of the predicted path are discarded and the instructions along the correct path are fetched. When executing an indirect branch instruction, the actual target address may be determined. If it is determined that the actual target address is different than the predicted target address, then the speculatively-executed instructions located at the predicted target address are discarded and the instructions located at the actual target address are fetched.

Memory instructions, such as load instructions and store instructions, may be forwarded, respectively, to the load execution pipeline 340 and store execution pipeline 342, where the address for the load instruction or store instruction is generated. The load execution pipeline 340 and the store execution pipeline 342 may each include an address generation unit (AGU) (not shown), which generates the address for its respective load instruction or store instruction. Referring still to FIG. 3, instructions from the floating-point scheduler unit 310 are forwarded to the floating-point execution unit 314, which comprises two floating-point execution pipelines 344, 346, although alternate embodiments may add to or subtract from the set of floating-point execution pipelines 344, 346. The first execution pipeline 344 may be used for floating point division, multiplication and single-instruction multiple data (SIMD) permute instructions, while the second execution pipeline 346 may be used for other SIMD scalar instructions. Once the operations from either of the floating-point execution pipelines 344, 346 have completed, the results from the instructions may be written back to the reorder buffer 318, the floating-point scheduling unit 310, and the L2 cache 328 (or memory 155 (shown in FIG. 1)).

Figure 4:
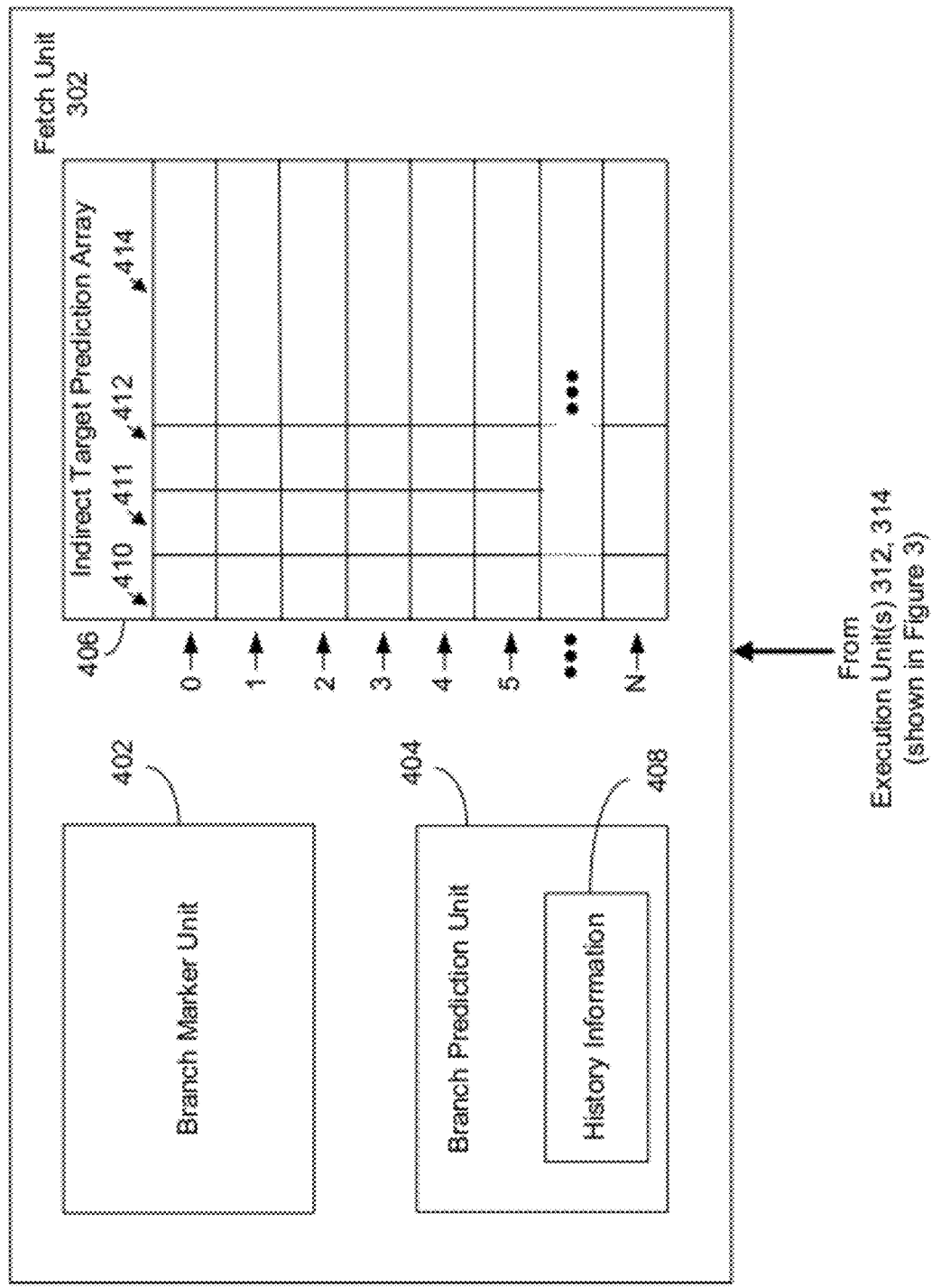
FIG. 4 illustrates an exemplary detailed representation of one embodiment of a fetch unit including a branch prediction mechanism according to one embodiment of the present invention.

Turning now to FIG. 4, a block diagram of the fetch unit 302 including a branch prediction mechanism, in accordance with an embodiment of the present invention, is illustrated. As shown, the fetch unit 302 may include a branch marker unit 402, a branch prediction unit 404, and an indirect target prediction array 406. The branch marker unit 402 may search cache lines fetched from the L1 I-Cache 324 to identify branch instructions stored in the cache lines. The branch marker unit 402 may also identify the type of the identified branch instructions (e.g., direct or indirect) and the branch address (i.e., the location of the branch instruction in the L1 I-Cache 324 (or higher memory subsystem)) of each of the identified branch instructions. In the event that the branch marker unit 402 identifies a branch instruction as being an indirect branch instruction, the branch marker unit 402 may further classify the branch instruction as being dynamic or static. An indirect branch instruction may be classified as being dynamic if the indirect branch instruction has had varying target addresses during previous executions. An indirect branch instruction may be classified as being static if the target address for the indirect branch instruction has been the same during previous executions. The branch type and branch address of the identified branch instructions may be forwarded to the branch prediction unit 404.

The branch prediction unit 404 may predict whether or not the conditional branch instruction is to be "taken" or "not taken" using branch prediction algorithms known in the art (e.g., a static prediction algorithm, a next line prediction algorithm, a bimodal prediction algorithm, a local branch prediction algorithm, a global branch algorithm, (i.e. a simple static scheme where branches are always predicted as "not taken" and the like). Accordingly, the branch prediction unit 404 may also include history information 408, which contains the outcome (i.e., "taken" or "not taken") of the last N conditional branches. The history information 408 may also contain information related to previous executions of indirect branch instructions. Accordingly, the branch marker unit 402 may use the history information 408 to identify an indirect branch instruction as being dynamic or static.

The branch prediction unit 404 may also predict the target address of indirect conditional branch instructions. In one embodiment, the branch prediction unit 402 may predict the target address using the indirect target prediction array 406. The indirect target prediction array 406 may be a data structure such as a buffer or a cache, which stores branch target addresses corresponding to previously-executed indirect conditional branch instructions. The branch target addresses may be stored in the indirect target prediction array 406 once the actual target addresses are computed by the appropriate execution unit 312, 314. The indirect target prediction array 406 may be accessed using an index. The method in which the index is derived may depend on the type of indirect branch instruction. For example, if the branch prediction unit 404 encounters an indirect static branch instruction, the branch prediction unit 404 may use a portion of the branch address of the indirect branch instruction being predicted as the index (i.e., a direct-mapped index). If the branch prediction unit 404 encounters an indirect dynamic branch instruction, the branch prediction unit 404 may use an index determined by a hashing function that uses at least a portion of the history information 408 and at least a portion of the branch address of the indirect branch instruction being predicted (i.e., a hashed index). By using a hashed index, more than one entry in the indirect target prediction array 406 may be allocated/accessed for each indirect dynamic branch instruction. For example, different entries may be selected for a particular indirect branch instruction if different indirect branch instructions precede the particular indirect branch instruction in the predicted instruction stream retrieved by the fetch unit 302. In this manner, if the target address of the indirect branch instruction being predicted changes based on different instructions being executed prior to that indirect branch instruction, the different target addresses may be stored in different entries of indirect target prediction array 406, and thus, the different target addresses may be correctly predicted. In one embodiment, the hashing function may comprise an XOR operation on at least a portion of the history information and at least a portion of the branch address of the indirect branch instruction being predicted.

Referring still to FIG. 4, the indirect branch prediction array 406 may contain 1 to N entries, where each entry contains information regarding a particular indirect branch instruction. Each entry may include a plurality of fields: a valid field 410, a static/dynamic (S/D) field 411, a tag field 412, and a target address field 414. The valid field 410 indicates whether or not the corresponding entry in the indirect branch prediction array 406 is valid. In one embodiment, the valid field 410 may contain a valid bit, which when set, indicates that the associated entry is valid. Conversely, the valid bit may indicate that the associated entry is invalid if the valid bit is cleared. The S/D field 411 may contain a bit indicative of whether the particular indirect branch instruction is a static indirect branch instruction or a dynamic indirect branch instruction. As an example, if the bit is clear, it may be indicative of the particular indirect branch instruction being a static indirect branch instruction. On the other hand, if the bit is set, it may be indicative of the particular indirect branch instruction being a dynamic indirect branch instruction. The tag field 412 may contain the tag (or a portion of the tag) of the branch address for a particular indirect branch instruction. The tag may be used to determine if an entry is allocated for an indirect branch instruction being predicted. For example, when the indirect branch prediction array 406 returns the tag from an entry specified by the index, the tag may be compared to the corresponding tag field of the branch address of the indirect branch instruction being predicted. If the tag returned from the indirect branch prediction array 406 matches the tag field of the branch address, it may be determined that a predicted target address for the indirect branch instruction being predicted is stored in the indirect target prediction array 406. Accordingly, the branch prediction unit 404 may be able to predict a target address for the indirect branch instruction being predicted. If no match occurs, then the branch prediction unit 404 may not be able to predict a target address for the indirect branch instruction being predicted.

The target address field 414 may contain the predicted target address for a particular indirect branch instruction. In one embodiment, the target address field may contain the full target address (e.g., a 48-bit linear address). In another embodiment, the target address field 414 may contain a portion of the target address. In other words, the target address field 414 may not need to specify a full-size target address. Typically, the target address for an indirect branch instruction lies within the same 24-bit aligned address range as the indirect branch instruction (this is typical with indirect dynamic branch instructions). As a result, only the lower 24 bits of the target address may be stored in the target address field 414. To calculate the full target address, the branch prediction unit 404 may concatenate the upper 24 bits of the branch address of the indirect branch instruction being predicted with the lower 24 bits of the target address stored in the target address field 414. By only storing the lower 24 bits of the target address, the number of entries of the indirect target prediction array 406 is effectively doubled. Moreover, the power and area that would have been consumed to actually double the number of entries in the indirect target prediction array 406 is prevented.

However, not all target addresses for indirect branch instructions may necessarily lie within the same 24-bit aligned address. For example, indirect static branch instructions typically lie outside the 24-bit aligned address. In addition, as previously stated, while it may be typical that indirect dynamic target instructions lie within the same 24-bit aligned address as the indirect branch instruction being predicted, it may not always be the case. As a result, it may be necessary to store the entire 48-bit target address for certain indirect branch instructions. Therefore, in one embodiment, two entries of the indirect branch prediction array 406 may be allocated for such indirect branch instructions. The first entry may contain the upper 24-bits of the target address, and the second entry may contain the lower 24-bits of the target address. In this case, when calculating the full target address, the upper 24 bits of the target address stored in the first entry may be concatenated with the lower 24-bits of the target address stored in the second entry. Both entries may contain the same tag in their respective tag fields 410, thereby indicating that both entries are associated with a particular indirect branch instruction. Because, it is possible that two entries may be needed to determine the full target address, the indirect target prediction array 406 may be configured to return two entries per index. In other words, a single index may be associated with two entries of the indirect target prediction array 406.

The fields 410, 411, 412, 414 may be populated with their respective data at the time of branch misprediction (i.e., when the appropriate execution unit 312, 314 determines that a target address for a particular branch instruction has been mispredicted). For example, if a particular indirect branch instruction is predicted to have a target address of A, and later, during execution, it is determined that the actual target address is B, the appropriate execution 312, 314 may send the actual target address to the fetch unit 302 via bus 303. In addition, because the actual target address differs from the predicted target address, the appropriate execution unit 312, 314 may determine that the indirect branch instruction is a dynamic indirect branch instruction and send a signal to the fetch unit 302 via bus 303. The branch prediction unit 404 may then index into the indirect target prediction array 406 and update the entry (or entries) corresponding to the particular indirect branch with the actual target address. The branch prediction unit 404 may also update the S/D field 411 of the corresponding entry. In this example, the branch prediction unit 404 may set the bit in the S/D field 411 indicating that the indirect branch instruction of the corresponding entry is a dynamic indirect branch instruction.

If it is determined that the actual target address lies within the same 24-bit aligned address as the branch address of the particular indirect branch instruction, then a single entry may be allocated in the indirect branch prediction array 406, which contains the lower 24-bit target address of the particular indirect branch instruction. Accordingly, the bit stored in the S/D field 411 for the single entry may be set to indicate the indirect branch instruction is a dynamic indirect branch instruction. On the other hand, if it is determined that the actual target address lies outside the 24-bit aligned address as the branch address of the particular indirect branch instruction, then two entries may be allocated in the indirect branch prediction array 406, where one entry contains the lower 24-bit target address for the particular indirect branch instruction, and the other entry contains the upper 24-bit target address for the particular indirect branch instruction. Accordingly, the bit stored in the S/D field 411 for the two entries may be set to indicate that the indirect branch instruction is a dynamic indirect branch instruction.

In the event that the actual target address is the same as the predicted target address, the appropriate execution unit 312, 314 may determine that the indirect branch instruction is a static indirect branch instruction. In this case, the appropriate execution unit 310, 312 may send a signal to the fetch unit 302 via bus 303. The branch prediction unit 404 may then index into the indirect target prediction array 406 and update the S/D field 411 for the entry (or entries) corresponding to the particular indirect branch. In this case, because the indirect branch instruction is a static indirect branch instruction, the branch prediction unit 404 may clear the bit stored in the S/D field 411 for the corresponding entry (or entries).

In the event that the target address was calculated for a branch instruction that was not predicted, a new entry in the indirect branch prediction array 406 may be allocated for the branch instruction. In one embodiment, the entry allocated may be determined by a cache replacement policy (e.g., an LRU (least-recently used) algorithm). In another embodiment, entries marked as invalid (i.e., entries having their valid fields cleared) may be allocated.

It is noted that the indirect target prediction array 406 may be configured to store different-sized portions of the full target address. For example, in one embodiment, if it is determined that target addresses for indirect branch instructions typically lie within the same 16-bit aligned address range as the indirect branch instructions being predicted, then the indirect target prediction array 406 may be configured to store the lower 16 bits of the target address. In another embodiment, if it is determined that target addresses for indirect branch instructions being predicted typically lie within the same 12-bit aligned address range as the indirect branch instruction, then the indirect target prediction array 406 may be configured to store the lower 12 bits of the target address.

Figure 5:
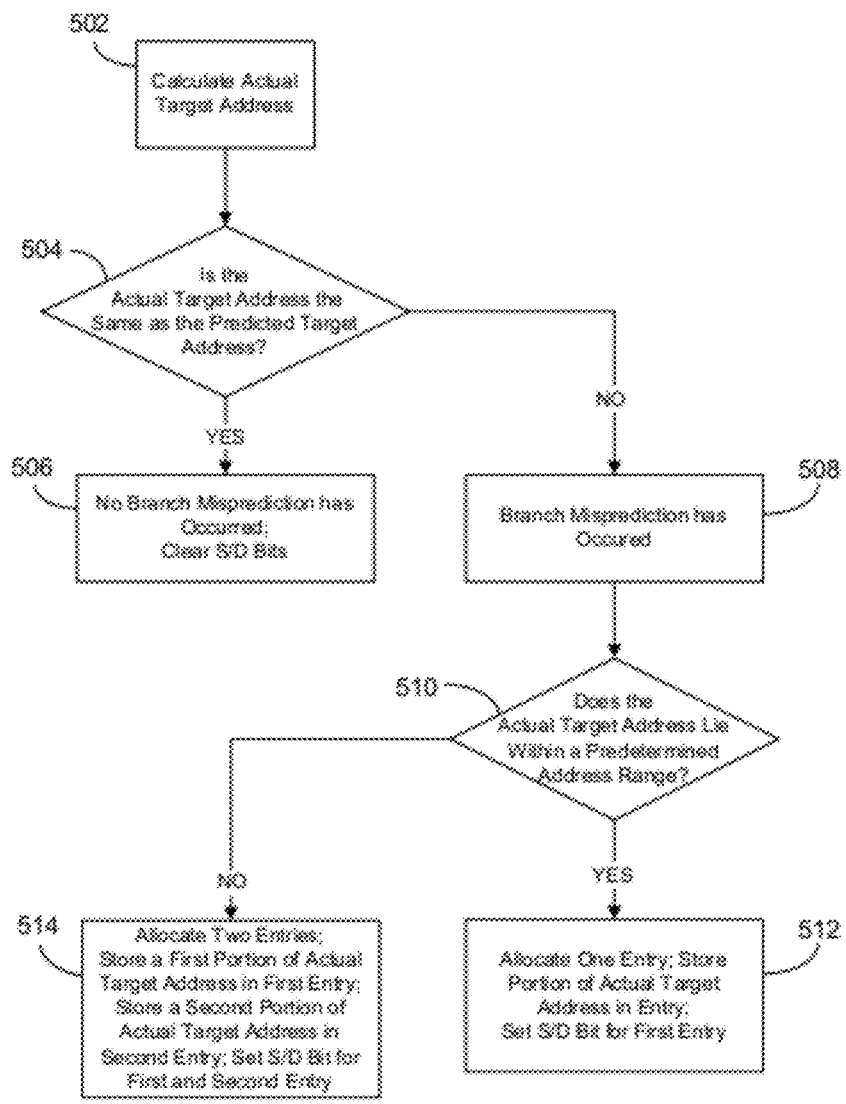
FIG. 5 illustrates a flowchart for operations for allocated entries in an indirect target prediction array according to one embodiment of the present invention.

Turning now to FIG. 5, a flowchart for operations for allocating entries in the indirect target prediction array 406, in accordance with one or more embodiments of the invention, is shown. The operations begin at a block 502, where the appropriate execution unit 312, 314 calculates the actual target address for a particular indirect branch instruction. At a block 504, it is determined whether or not the actual target address is the same as the predicted target address of the particular indirect branch instruction. If the actual target address and the predicted target address are the same, then at a block 506, it is determined that no misprediction occurred. It may also be determined that the particular indirect branch instruction is a static indirect branch instruction. Therefore, the bit in the S/D field 411 of the entry (or entries) in the indirect target prediction array 406 corresponding to the particular indirect branch instruction may be cleared. On the other hand, if the actual target address and the predicted target address are different, then at a block 508, it is determined that a misprediction occurred. It may also be determined that the particular branch instruction is a dynamic indirect branch instruction. The operations then continue to a block 510, where it is determined if the actual target address lies within a predetermined target range (e.g., a 24-bit aligned address of the particular indirect branch instruction). If it is determined that the actual target address lies within the predetermined target range of the particular indirect branch instruction, then at a block 512, one entry is allocated in the indirect target prediction array 406, and a portion of the actual target address (e.g., the lower 24 bits) is stored in the target address field 414 of the entry. The bit in the S/D field 411 may also be set in the entry allocated. On the other hand, if it is determined that the actual target address does not lie within the predetermined address range of the particular indirect branch instruction, then at a block 514, two entries are allocated in the indirect target prediction array 406. The first portion of the actual target address (e.g., the lower 24 bits of a 48-bit linear address) is stored in the target address field 414 of one entry, and the second portion of the actual target address (e.g., the upper 24 bits of the a 48-bit linear address) is stored in the target address field 414 of the other entry. The bit in the S/D field 411 for each of the entries allocated may also be set. The entry (or entries) chosen may be determined by the index. As previously stated, the index may either be a direct-mapped index or a hashed index. In the particular example above, the actual target address differs from the predicted target address. As a result, it is likely that the particular indirect branch instruction is dynamic (i.e., the target address changes from execution to execution. Thus, in this case, the index type used to access the indirect target prediction array 406 may be the hashed index.

Figure 6:
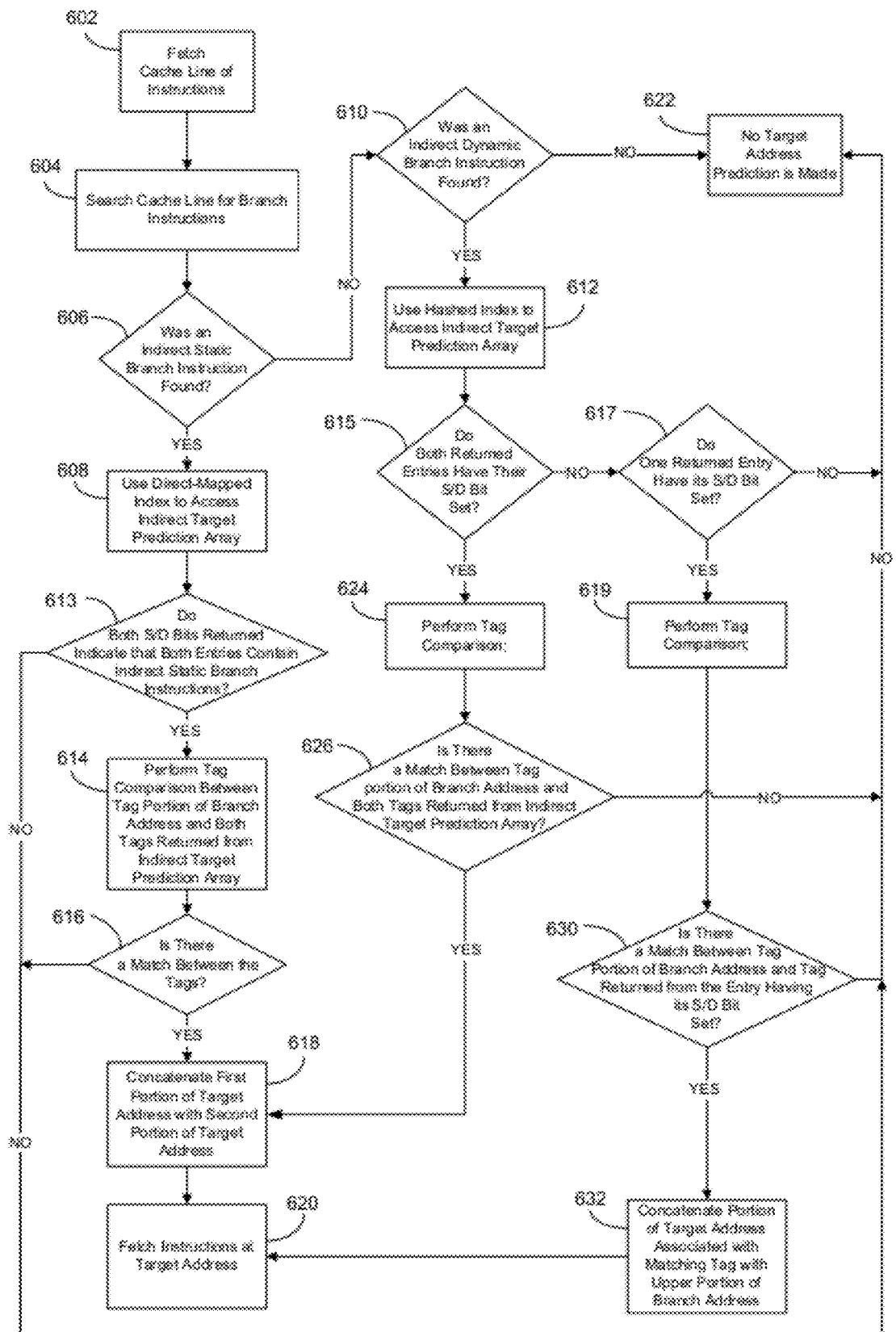
FIG. 6 illustrates a flowchart for operations for determining a predicted target address for an indirect branch instruction according to one embodiment of the present invention.

Turning now to FIG. 6, a flowchart for operations for determining a predicted target address for an indirect branch instruction, in accordance with one or more embodiments of the invention, is shown. The operations begin at a block 602, where the fetch unit 302 retrieves a cache line containing instructions (e.g., from the L1 I-cache 324, L2 cache 328 or the system memory 155). At a block 604, the branch marker unit 402 may search the fetched cache line for branch instructions. At a block 606, it is determined whether an indirect static branch instruction was found. If an indirect static branch instruction was found, then at a block 608, the fetch unit 302 may use a direct-mapped index to find a predicted target address in the indirect target prediction array 406. On the other hand, if an indirect static branch instruction was not found, then at a block 610 the branch prediction unit 404 may determine if an indirect dynamic branch instruction was found. If an indirect dynamic static branch instruction was found, then at a block 612, the branch prediction unit 404 may use a hashed index to find a predicted target address in the indirect target prediction array 406. On the other hand, if no indirect dynamic static branch instruction was found, then at a block 622, no target address prediction is made.

Returning to the block 608, after a direct-mapped index is used to search the indirect target prediction array 406, at a block 613, the S/D bits returned from the two entries are checked to determine if the returned entries both contain static indirect branch instructions. If one or both entries contain an S/D bit that indicates that the corresponding entry contains a dynamic indirect branch instruction, then at a block 622, no target prediction is made. On the other hand, if the S/D bits of both entries returned indicate that both entries contain static indirect branch instructions, then at a block 614, a tag comparison is performed between the tag portion of the branch address of the indirect static branch instruction and the tags returned from the two entries returned from the indirect target prediction array 406. At a block 616, it is determined if there is a match between the tags. If a match occurred between the tag field of the branch address of the indirect static branch instruction and the tags returned from the indirect target prediction array 406, then at a block 618, the first portion of the target address (e.g., the lower half of a 48-bit linear address) stored in the tag field 412 of one returned entry of the indirect target prediction array 406 is concatenated with the second portion of the target address (e.g., the upper half of a 48-bit linear address) stored in the tag field 412 of the other returned entry of the indirect target prediction array 406 to create the full target address. At a block 620, the instruction(s) at the target address are then fetched. On the other hand, if no match occurred, or the tag field of the branch address matched only one of the tags returned from the indirect target prediction array 406, then, at the block 622, no prediction is made for the target address.

Returning to the block 612, after a hashed index is used to search the indirect target prediction array 406, at a block 615, it may be determined whether or not both returned entries of the indirect target prediction array 406 have their S/D bits set, thereby indicating that both entries contain dynamic indirect branch instructions. If it is determined that both entries have their S/D bits set, then at a block 624, a tag comparison is performed between the tag portion of the branch address of the indirect dynamic branch instruction and the tags returned from the two entries returned from the indirect target prediction array 406. At the block 626, it is determined if there is a match between the tag portion of the branch address of the indirect branch instruction and the tags returned from the indirect target prediction array. If a match occurred between the tag field of the branch address of the indirect dynamic branch instruction and both tags returned from the indirect target prediction array 406, then at the block 618, the lower half of the target address stored in the target address field 414 of one returned entry of the indirect target prediction array 406 is concatenated with the upper half of the target address stored in the target address field 414 of the other returned entry of the indirect target prediction array 406 to create the full target address. In other words, the predicted target address does not lie within the same 24-bit aligned address as the indirect branch instruction being predicted. At the block 620, the instruction(s) at the target address are then fetched. On the other hand, if not match occurred at the block 626, then no target address prediction is made at the block 622.

Returning to the block 615, if it is determined that both entries do not have their S/D bits set, then at a block 617, it may be determined whether or not one returned entry has its S/D bit set. If it is determined that one returned entry has its S/D bit set, then at a block 619, a tag comparison is performed between the tag portion of the branch address of the indirect dynamic branch instruction and the tag returned from the entry returned having its S/D bit. At a block 630, it may be determined whether or not a match between the tag portion of the branch address of the indirect branch instruction and the tag returned from the entry having its S/D bit set. If the tag portion of the branch address matches the tag field 412 of the entry having its S/D bit set, then at a block 632, the lower half of the target address stored in the target address field 414 of the matching entry is concatenated with the upper half of the branch address of the indirect branch instruction to create the full target address. In other words, the predicted target address lies within the same 24-bit aligned address as the indirect branch instruction being predicted. At the block 620, the instruction(s) at the target address are then fetched. On the other hand, if no match occurs, then at the block 622, no target address is made.

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 130 & 155, compact discs, DVDs, solid state storage and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into a computer 100, processor 125/140 or controller, which may then control, in whole or part, the operation of a semiconductor manufacturing facility (or fab) to create semiconductor products and devices. For example, in one embodiment, silicon wafers containing 10T bitcells 500, 10T bitcell arrays 420 and/or array banks 410 may be created using the GDSII data (or other similar data).

It should also be noted that while various embodiments may be described in terms of memory storage for graphics processing, it is contemplated that the embodiments described herein may have a wide range of applicability, not just for graphics processes, as would be apparent to one of skill in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope and spirit of the claimed invention.

Accordingly, the protection sought herein is as set forth in the claims below.

What is claimed:

1. A method comprising:
   accessing a first entry and a second entry of a data structure, wherein each entry comprises a static/dynamic field and a target address field, wherein each target address field stores a portion of a predicted target address;
   identifying a fetched branch instruction as being a first type or second type based on the static/dynamic field of the first entry;
   determining the predicted target address using only the portion of the predicted target address stored in the first entry and a portion of a branch address of a fetched branch instruction for the fetched branch instruction of the first type; and
   determining the predicted target address using only the portion of the predicted target address stored in the first entry and the portion of the predicted target address stored in the second entry for the fetched branch instruction of the second type.

2. The method of claim 1, wherein the first entry and the second entry are accessed using a single index.

3. The method of claim 1, wherein the first entry and the second entry are accessed using a direct-mapped index.

4. The method of claim 1, wherein the first entry and the second entry are accessed using a hashed index.

5. The method of claim 3, wherein the direct-mapped index is determined by at least a portion of a branch address of the fetched branch instruction.

6. The method of claim 4, wherein the hashed index is determined by a hashing function based on history information of previously-executed branch instructions and at least a portion of a branch address of the fetched branch instruction.

7. The method of claim 1, wherein the predicted target address is determined by concatenating the portion of the predicted target address stored in the first entry with the portion of the branch address of the fetched branch instruction in response to determining that the fetched branch instruction is of the first type.

8. The method of claim 1, wherein the predicted target address is determined by concatenating the portion of the predicted target address stored in the first entry with the portion of the predicted target address stored in the second in response to determining that the branch instruction is of the second type.

9. The method of claim 1, where the fetched branch instruction is identified as being of a first type if the static/dynamic field of the first entry is indicative of the fetched branch instruction being dynamic or as being of a second type if the static/dynamic field of the first entry is indicative of the fetched branch instruction being static.

10. An apparatus, comprising:
a processor configured to:
access a first entry and a second entry of a data structure, wherein each entry comprises a static/dynamic field and a target address field, wherein each target address field stores a portion of a predicted target address;
identify a fetched branch instruction as being a first type or second type based on the static/dynamic field of the first entry;
determine the predicted target address using only the portion of the predicted target address stored in the first entry and a portion of a branch address of a fetched branch instruction for the fetched branch instruction of the first type; and
determine the predicted target address using only the portion of the predicted target address stored in the first entry and the portion of the predicted target address stored in the second entry for the fetched branch instruction of the second type.

11. The apparatus of claim 10, wherein the first entry and the second entry are accessed using a single index.

12. The apparatus of claim 10, wherein the first entry and the second entry are accessed using a direct-mapped index.

13. The apparatus of claim 10, wherein the first entry and the second entry are accessed using a hashed index.

14. The apparatus of claim 12, wherein the direct-mapped index is determined by at least a portion of a branch address of the fetched branch instruction.

15. The apparatus of claim 13, wherein the hashed index is determined by a hashing function based on history information of previously-executed branch instructions and at least a portion of a branch address of the fetched branch instruction.

16. The apparatus of claim 10, wherein the predicted target address is determined by concatenating the portion of the predicted target address stored in the first entry with the portion of the branch address of the fetched branch instruction in response to determining that the fetched branch instruction is of the first type.

17. The apparatus of claim 10, wherein the predicted target address is determined by concatenating the portion of the predicted target address stored in the first entry with the portion of the predicted target address stored in the second in response to determining that the branch instruction is of the second type.

18. The apparatus of claim 10, where the fetched branch instruction is identified as being of a first type if the static/dynamic field of the first entry is indicative of the fetched branch instruction being dynamic or as being of a second type if the static/dynamic field of the first entry is indicative of the fetched branch instruction being static.

19. A computer readable storage medium encoded with data that, when implemented in a manufacturing facility, adapts the manufacturing facility to create an apparatus, comprising:

a processor configured to:
access a first entry and a second entry of a data structure, wherein each entry comprises a valid field, a static/dynamic field, a tag field, and a target address field, wherein each target address field stores a portion of a predicted target address;
identify a fetched branch instruction as being a first type or second type based on the static/dynamic field of the first entry;
determine the predicted target address using only the portion of the predicted target address stored in the first entry and a portion of a branch address of a fetched branch instruction for the fetched branch instruction of the first type; and
determine the predicted target address using only the portion of the predicted target address stored in the first entry and the portion of the predicted target address stored in the second entry for the fetched branch instruction of the second type.

20. The computer readable storage medium of claim 19, wherein the first entry and the second entry are accessed using a single index.

21. The computer readable storage medium of claim 19, wherein the first entry and the second entry are accessed using a direct-mapped index.

22. The computer readable storage medium of claim 19, wherein the first entry and the second entry are accessed using a hashed index.

23. The computer readable storage medium of claim 21, wherein the direct-mapped index is determined by at least a portion of a branch address of the fetched branch instruction.

24. The computer readable storage medium of claim 22, wherein the hashed index is determined by a hashing function based on history information of previously-executed branch instructions and at least a portion of a branch address of the fetched branch instruction.

25. The computer readable storage medium of claim 19, wherein the predicted target address is determined by concatenating the portion of the predicted target address stored in the first entry with the portion of the branch address of the fetched branch instruction in response to determining that the fetched branch instruction is of the first type.

26. The computer readable storage medium of claim 19, wherein the predicted target address is determined by concatenating the portion of the predicted target address stored in the first entry with the portion of the predicted target address stored in the second in response to determining that the branch instruction is of the second type.

27. The computer readable storage medium of claim 19, where the fetched branch instruction is identified as being of a first type if the static/dynamic field of the first entry is indicative of the fetched branch instruction being dynamic or as being of a second type if the static/dynamic field of the first entry is indicative of the fetched branch instruction being static.

* * * * *